US008233067B2

(12) United States Patent
Kondo

(10) Patent No.: US 8,233,067 B2
(45) Date of Patent: Jul. 31, 2012

(54) SOLID-STATE IMAGING DEVICE, SIGNAL PROCESSING METHOD OF SOLID-STATE IMAGING DEVICE, AND IMAGE CAPTURING APPARATUS

(75) Inventor: Hiroyasu Kondo, Fukuoka (JP)

(73) Assignee: Sony Corporation (JP)

( * ) Notice: Subject to any disclaimer, the term of this patent is extended or adjusted under 35 U.S.C. 154(b) by 318 days.

(21) Appl. No.: 12/655,536

(22) Filed: Dec. 31, 2009

(65) Prior Publication Data

US 2010/0171853 A1 Jul. 8, 2010

(30) Foreign Application Priority Data

Jan. 6, 2009 (JP) ............................... P2009-001000

(51) Int. Cl.
*H04N 3/14* (2006.01)
*H04N 5/335* (2011.01)
*H03M 1/34* (2006.01)
(52) U.S. Cl. ......... 348/303; 348/308; 348/302; 341/165
(58) Field of Classification Search .......... 348/303–304, 348/308–309; 341/163–165, 169
See application file for complete search history.

(56) References Cited

U.S. PATENT DOCUMENTS

| 6,933,972 | B2 * | 8/2005 | Suzuki et al. | 348/302 |
|---|---|---|---|---|
| 7,019,345 | B2 * | 3/2006 | Pain et al. | 257/292 |
| 7,292,177 | B2 * | 11/2007 | Muramatsu et al. | 341/164 |
| 7,321,329 | B2 * | 1/2008 | Tooyama et al. | 341/163 |
| 7,471,230 | B2 * | 12/2008 | Tooyama et al. | 341/164 |
| 7,567,280 | B2 * | 7/2009 | Muramatsu et al. | 348/294 |
| 7,629,914 | B2 * | 12/2009 | Muramatsu et al. | 341/164 |
| 7,952,510 | B2 * | 5/2011 | Shimomura et al. | 341/164 |
| 2007/0008206 | A1 * | 1/2007 | Tooyama et al. | 341/155 |
| 2008/0094271 | A1 * | 4/2008 | Tooyama et al. | 341/155 |
| 2008/0170137 | A1 * | 7/2008 | Matsumoto et al. | 348/241 |
| 2009/0128653 | A1 * | 5/2009 | Tanaka | 348/222.1 |

FOREIGN PATENT DOCUMENTS

JP 2005-311487 A 11/2005

* cited by examiner

*Primary Examiner* — Kelly L Jerabek
(74) *Attorney, Agent, or Firm* — Lerner, David, Littenberg, Krumholz & Mentlik, LLP

(57) ABSTRACT

A solid-state imaging device includes: a plurality of pixel circuits each including a photoelectric conversion element; reading signal lines connected to the pixel circuits; a reference signal output circuit outputting a reference signal whose voltage level varies; a reference signal line connected to the reference signal output circuit; and comparators each having a first input terminal and a second input terminal and each inverting its output depending on a voltage relation of the first input terminal and the second input terminal, wherein the first input terminals of some of the comparators are connected to the reading signal lines and the second input terminals thereof are connected to the reference signal line, and wherein the first input terminals of the other of the comparators are connected to the reference signal line and the second input terminals thereof are connected to the reading signal lines.

12 Claims, 12 Drawing Sheets

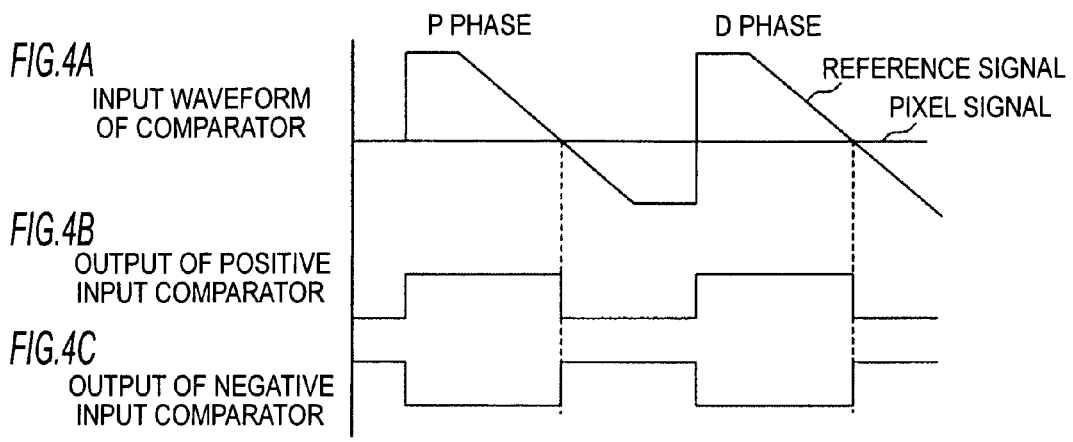
FIG.4A INPUT WAVEFORM OF COMPARATOR
FIG.4B OUTPUT OF POSITIVE INPUT COMPARATOR
FIG.4C OUTPUT OF NEGATIVE INPUT COMPARATOR
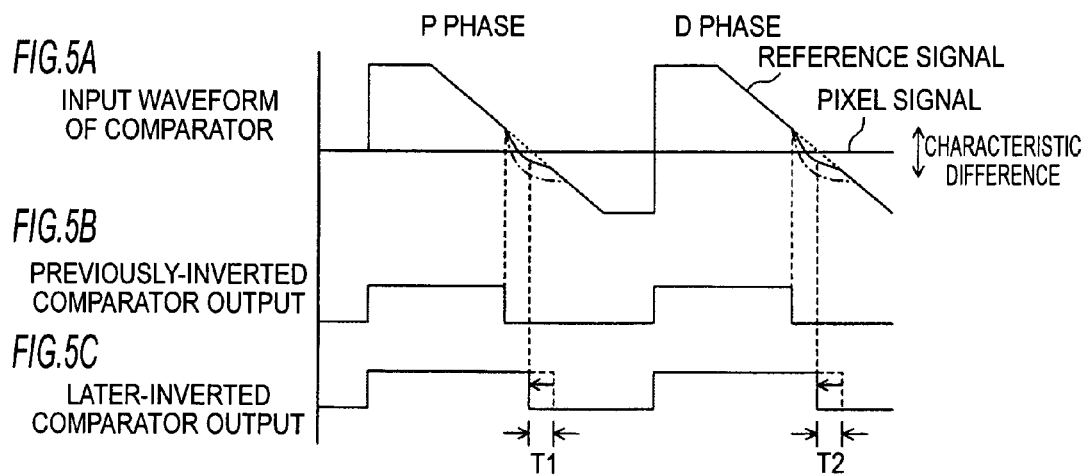
FIG.5A INPUT WAVEFORM OF COMPARATOR
FIG.5B PREVIOUSLY-INVERTED COMPARATOR OUTPUT
FIG.5C LATER-INVERTED COMPARATOR OUTPUT

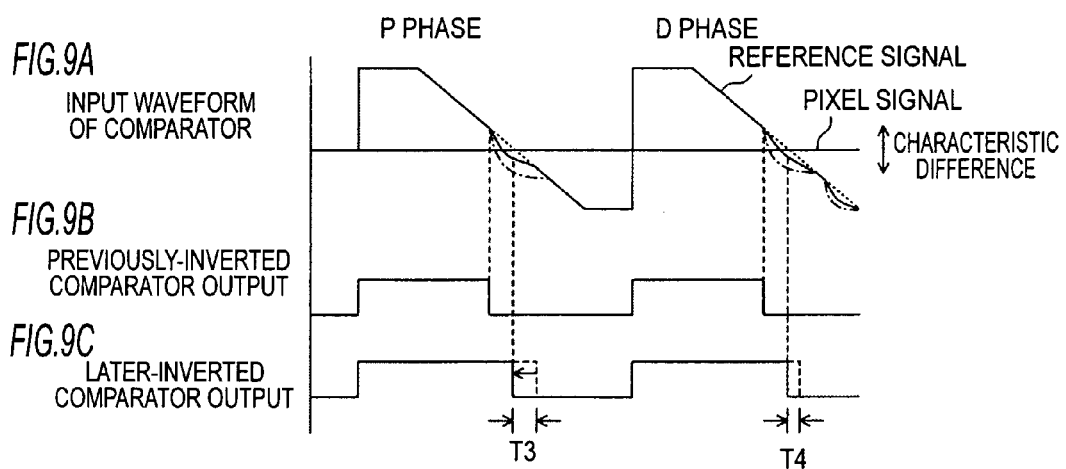
FIG.9A INPUT WAVEFORM OF COMPARATOR
FIG.9B PREVIOUSLY-INVERTED COMPARATOR OUTPUT
FIG.9C LATER-INVERTED COMPARATOR OUTPUT
FIG.10
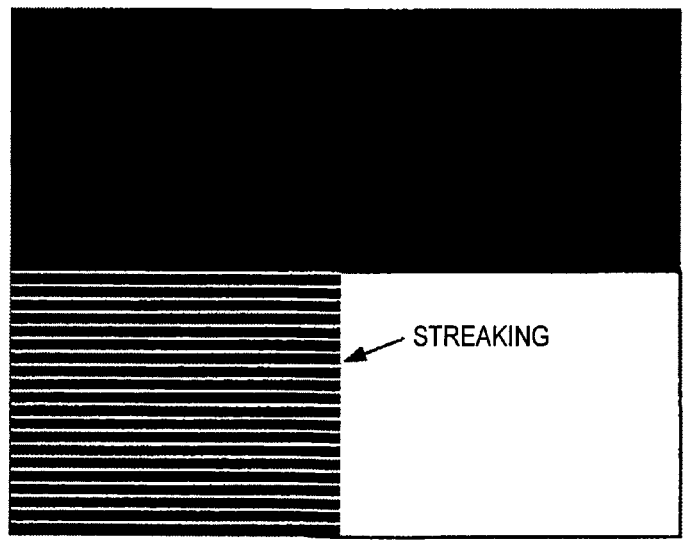

SOLID-STATE IMAGING DEVICE, SIGNAL PROCESSING METHOD OF SOLID-STATE IMAGING DEVICE, AND IMAGE CAPTURING APPARATUS

CROSS-REFERENCE TO RELATED APPLICATION

The present application claims priority from Japanese Patent Application No. JP 2009-001000 filed in the Japanese Patent Office on Jan. 6, 2009, the entire content of which is incorporated herein by reference.

BACKGROUND OF THE INVENTION

1. Field of the Invention

The present invention relates to a solid-state imaging device in which a reading signal of a photoelectric conversion element is compared with a reference signal by the use of a comparator, a signal processing method of the solid-state imaging device, and an image capturing apparatus.

2. Description of the Related Art

Japanese JP-A-2005-311487 discloses a solid-state imaging device including plural pixel circuits each having a photoelectric conversion element, plural comparators, and plural column signal lines connecting the photoelectric conversion elements to the comparators. Each comparator compares the voltage of a column signal line and the voltage of a reference signal line and inverts its output on the basis of the voltage relation as the comparison result.

SUMMARY OF THE INVENTION

In the solid-state imaging device, as disclosed in JP-A-2005-311487, plural pixel circuits each having a photoelectric conversion element are generally two-dimensionally arranged in a matrix.

The plural comparators are arranged along one side of a pixel area in which the plural pixel circuits are arranged.

A reference signal line for supplying the reference voltage to the plural comparators is disposed to extend along one side of the pixel area and to be connected to the plural comparators.

In such a layout, the reference signal line intersects plural column signal lines. The reference signal line intersects the plural comparators or output signal lines of the plural comparators.

Accordingly, the reference signal line is coupled to the plural column signal lines. As a result, when the outputs of the plural comparators are simultaneously inverted, the voltage level of the reference signal may vary by the influence of the inversion of the plural outputs.

When the voltage level of the reference signal varies, the times of inverting the outputs of the comparators are deviated from the original times without such a variation.

For example, when counters or the like are connected to the outputs of the comparators and values corresponding to the received light intensity of the photoelectric conversion elements are obtained on the basis of the times of inverting the outputs of the comparators, the obtained values may not correspond to the received light intensity.

The phenomenon that the outputs of the plural comparators are simultaneously inverted occurs, for example, when a subject having a uniform color or a subject having uniform brightness is imaged and voltage levels of plural pixel signals (column signal lines) input to the plural comparators from the plural photoelectric conversion elements are uniform.

When the outputs of the plural comparators are simultaneously inverted, horizontal streaks or the like which the subject does not have may be formed in the image obtained by imaging the subject having the uniform color or brightness.

The phenomenon that the outputs of the plural comparators are simultaneously inverted may occur in a line sensor in which plural pixel circuits or plural photoelectric conversion elements are arranged in a line.

Thus, it is desirable to provide a solid-state imaging device, a signal processing method of the solid-state imaging device, and an image capturing apparatus, which can suppress an influence of a variation in voltage level of a reference signal on a captured image.

According to an embodiment of the present invention, there is provided a solid-state imaging device including: a plurality of pixel circuits each including a photoelectric conversion element; a plurality of reading signal lines connected to the plurality of pixel circuits; a reference signal output circuit outputting a reference signal whose voltage level varies; a reference signal line connected to the reference signal output circuit; and a plurality of comparators each having a first input terminal and a second input terminal and each inverting its output depending on a voltage relation of the first input terminal and the second input terminal. Here, the first input terminals of some of the plurality of comparators are connected to the reading signal lines and the second input terminals thereof are connected to the reference signal line, and the first input terminals of the other of the plurality of comparators are connected to the reference signal line and the second input terminals thereof are connected to the reading signal lines.

The solid-state imaging device may suitably further include counters to which the outputs of the comparators are input, respectively. Here, the reference signal output circuit may change the level of the reference signal in synchronization with the counters, and each counter may count until the output of the corresponding comparator is inverted in each period where the reference signal output circuit changes the level of the reference signal.

The reference signal output circuit may suitably change the voltage level of the reference signal in a reset period before the outputs of the pixel circuits are read and may change the voltage level of the reference signal in a reading period where the outputs of the pixel circuits are read.

According to another embodiment of the present invention, there is provided a signal processing method of a solid-state imaging device including the steps of: connecting some of a plurality of pixel circuits each having a photoelectric conversion element to a plurality of reading signal lines; outputting a reference signal, a voltage level of which varies, to a reference signal line from a reference signal output circuit; and comparing the voltage levels of the plurality of reading signal lines with the voltage level of the reference signal line using a combination of comparators whose first input terminal is connected to the corresponding reading signal line and a second input terminal is connected to the reference signal line and comparators whose first input terminal is connected to the reference signal line and the second input terminal is connected to the corresponding reading signal line as a plurality of comparators whose output is inverted depending on a voltage relation of the first input terminal and the second input terminal.

According to still another embodiment of the present invention, there is provided an image capturing apparatus including: a solid-state imaging device; and an optical system forming an image of a subject on the solid-state imaging device, wherein the solid-state imaging device includes a plurality of pixel circuits each including a photoelectric conversion element, a plurality of reading signal lines connected to the plurality of pixel circuits, a reference signal output circuit outputting a reference signal whose voltage level varies, a reference signal line connected to the reference signal output circuit, and a plurality of comparators each having a first input terminal and a second input terminal and each inverting its output depending on a voltage relation of the first input terminal and the second input terminal. Here, the first input terminals of some of the plurality of comparators are connected to the reading signal lines and the second input terminals thereof are connected to the reference signal line, and the first input terminals of the other of the plurality of comparators are connected to the reference signal line and the second input terminals thereof are connected to the reading signal lines.

In the above-mentioned embodiments, some of the plural comparators invert the outputs on the basis of the fact that the voltage level of the first input terminal thereof is higher or lower than the voltage level of the second input terminal.

On the contrary, the other of the plural comparators invert the outputs on the basis of the fact that the voltage level of the first input terminal thereof is higher or lower than the voltage level of the second input terminal.

Therefore, the inversion of the outputs of some comparators and the inversion of the outputs of the other comparators have a reverse phase relation. That is, the influence of some comparators on the voltage level of the reference signal and the influence of the other comparators on the voltage level of the reference signal are canceled by each other.

Accordingly, even when the outputs of the plural comparators are simultaneously inverted, the voltage level of the reference signal hardly varies.

According to the embodiments of the present invention, it is possible to suppress the influence of the variation in voltage level of the reference signal on the captured image.

BRIEF DESCRIPTION OF THE DRAWINGS

FIGS. 4A to 4C are timing diagrams illustrating signal waveforms in a reading period corresponding to one row in the CMOS image sensor shown in FIG. 1.

FIGS. 5A to 5C are diagrams illustrating examples of signal waveforms when outputs of plural comparators are simultaneously inverted.

FIGS. 9A to 9C are diagrams illustrating other examples of signal waveforms when outputs of plural comparators are simultaneously inverted.

FIG. 10 is a diagram illustrating an example of an image obtained by capturing the subject shown in FIG. 8 by the use of the CMOS image sensor according to the comparative example shown in FIG. 6.

DESCRIPTION OF PREFERRED EMBODIMENTS

Hereinafter, preferred embodiments of the present invention will be described with reference to the accompanying drawings. The description is made in the following sequence.
1. First Embodiment (Example of Solid-state Imaging Device for Black-and-white Image or Monochromatic Image)
2. Second Embodiment (Example of Solid-state Imaging Device in which Comparators are Arranged in Two Lines)
3. Third Embodiment (Example of Solid-state Imaging Device for Color Image in Bayer Arrangement)
4. Fourth Embodiment (Example of Solid-state Imaging Device in which Noise Ratio of Two Types of Comparators Having Different Connection Relations is 2:1)
5. Fifth Embodiment (Example of Solid-state Imaging Device Having Inverting Circuit)
6. Sixth Embodiment (Example of Solid-state Imaging Device Having Switch Circuit and Polarity Matching Circuit)
7. Seventh Embodiment (Example of Camera System Employing Image Capturing Apparatus)
1. First Embodiment
Configuration of Solid-State Imaging Device FIG. 1 schematically shows a layout of a CMOS (Complementary Metal Oxide Semiconductor) image sensor 1 of a column AD (Analog to Digital) conversion type employing a solid-state imaging device according to a first embodiment of the present invention.

The CMOS image sensor 1 has a circuit configuration most effective for reducing streaking in capturing a black-and-white image or capturing a monochromatic image.

The streaking in this specification means a horizontal streak, which a subject does not have, formed in the captured image.

Figure 1:
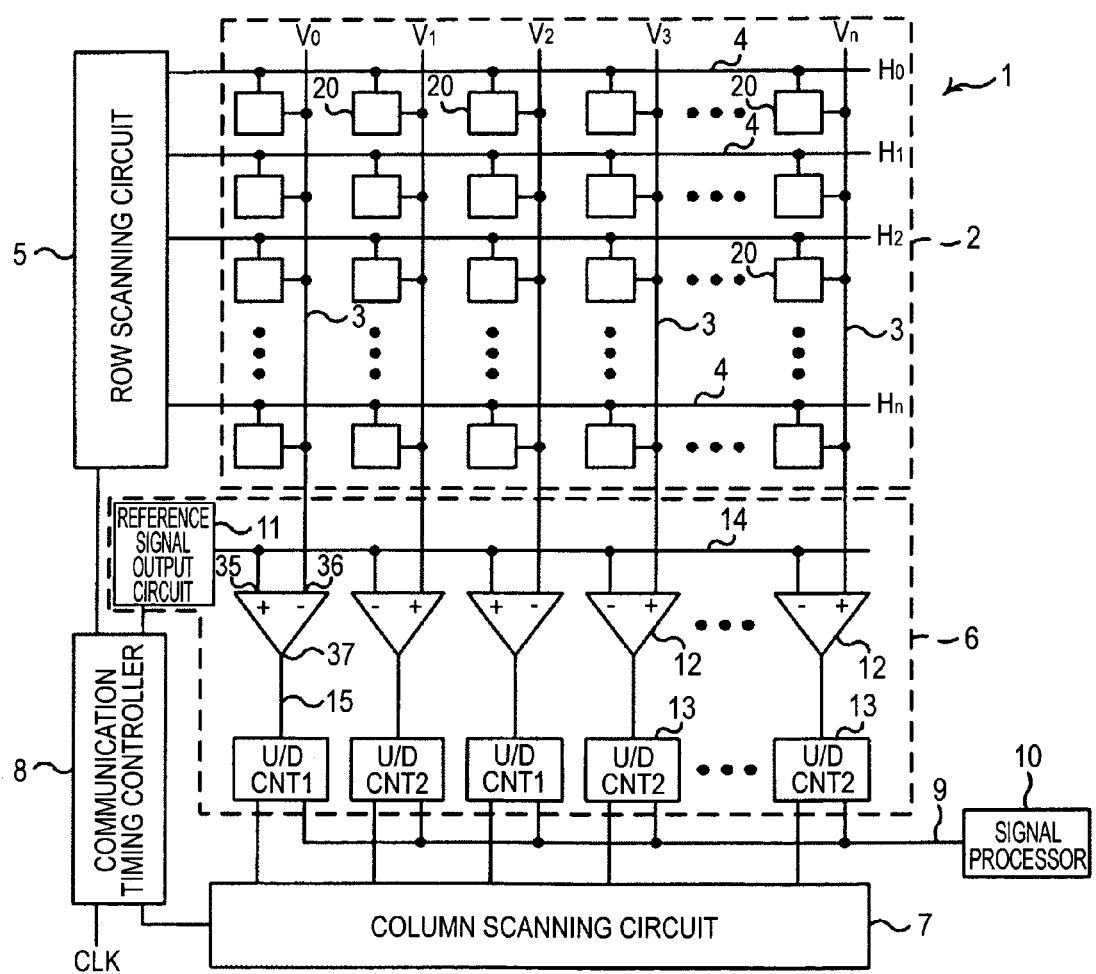
FIG. 1 is a diagram schematically illustrating a layout of a CMOS image sensor employing a solid-state imaging device according to a first embodiment of the present invention.

The CMOS image sensor 1 shown in FIG. 1 includes plural unit pixel circuits (pixel circuits) 20.

Figure 2:
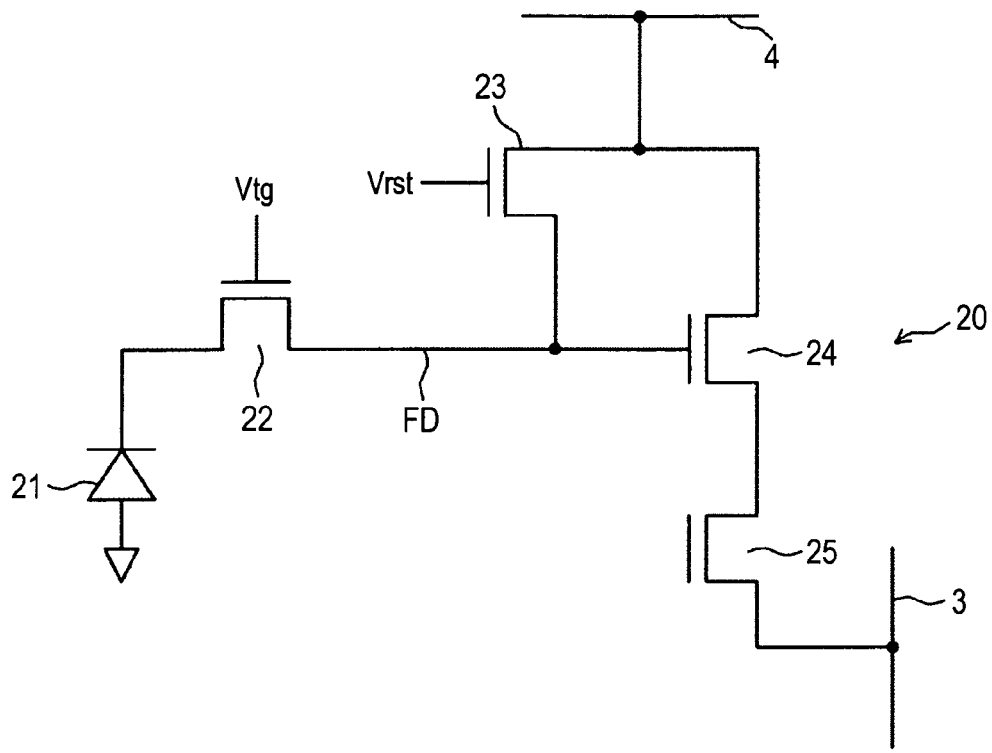
FIG. 2 is a circuit diagram illustrating an example of a unit pixel circuit shown in FIG. 1.

As shown in FIG. 2, each unit pixel circuit 20 includes a photo diode (photoelectric conversion element) 21, a transmission transistor 22, a reset transistor 23, an amplification transistor 24, and a selection transistor 25.

The source of the selection transistor 25 is connected to a column signal line 3 to be described later. The source of the amplification transistor 24 is connected to the drain of the selection transistor 25, and the drain thereof is connected to a row signal line 4 to be described later.

The source of the transmission transistor 22 is connected to the photo diode 21 and the drain thereof is connected to the gate of the amplification transistor 24.

When the transmission transistor 22 is in an ON state (current-carrying state), current generated in the photo diode 21 depending on the received light intensity flows to the gate of the amplification transistor 24 via the transmission transistor 22.

The amplification transistor 24 causes the current, which is obtained by amplifying the gate current, to flow to the column signal line 3 via the selection transistor 25. The voltage of the column signal line 3 has a level corresponding to the current generated in the photo diode 21.

The source of the reset transistor 23 is connected to a node (floating diffusion FD) between the transmission transistor 22 and the amplification transistor 24 and the drain thereof is connected to the row signal line 4 to be described later.

When the reset transistor 23 is in an ON state, the floating diffusion FD is connected to the row signal line 4 to be described later.

The current corresponding to the potential of the floating diffusion FD in that state flows to the column signal line 3 via the selection transistor 25 from the amplification transistor 24.

The voltage of the column signal line 3 has a level corresponding to the potential of the floating diffusion FD.

The potential of the floating diffusion FD varies depending on the characteristic of the photo diode 21 and is not constant in the plural unit pixel circuits 20.

The plural unit pixel circuits 20 are two-dimensionally arranged in a matrix in a pixel area 2 corresponding to a light-receiving area of the CMOS image sensor 1.

Plural column signal lines (reading signal lines) 3 and plural row signal lines 4 are arranged in the pixel area 2. Each row signal line 4 is connected to the unit pixel circuits 20 extending in a row. Each column signal line 3 is connected to the unit pixel circuits 20 extending in a column.

The CMOS image sensor 1 additionally includes a row scanning circuit 5, a column AD conversion circuit 6, a column scanning circuit 7, and a communication timing controller 8. The column AD conversion circuit 6 includes a reference signal output circuit 11, plural comparators 12, and plural counters 13.

The reference signal output circuit 11 is connected to a reference signal line 14. The reference signal output circuit 11 outputs a reference signal to the reference signal line 14. The voltage level of the reference signal varies in a ramp waveform.

Each comparator 12 includes an inverting input terminal 36, a noninverting input terminal 35, and an output terminal 37.

Figure 3:
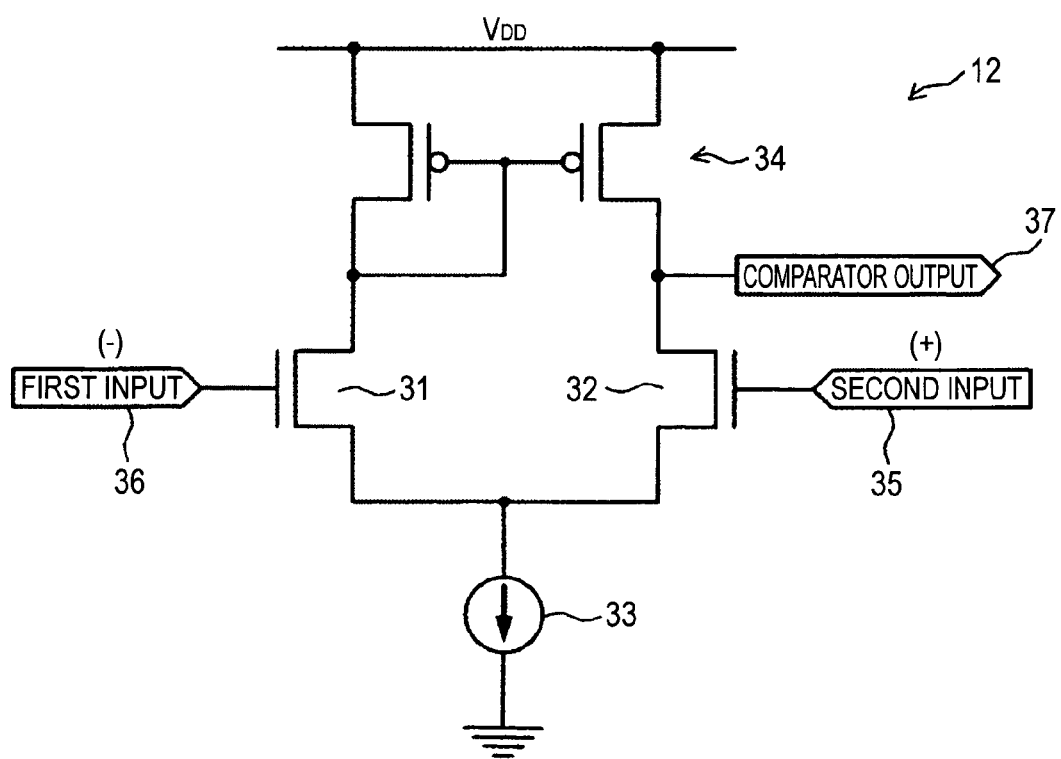
FIG. 3 is a circuit diagram illustrating an example of a comparator shown in FIG. 1.

As shown in FIG. 3, the comparator 12 includes a first transistor 31, a second transistor 32, a constant current circuit 33, and a current relay circuit 34.

The gate of the first transistor 31 is connected to the inverting input terminal 36, the source thereof is connected to the current relay circuit 34, and the drain thereof is connected to the constant current circuit 33. The current relay circuit 34 is connected to the output terminal 37.

The gate of the second transistor 32 is connected to the noninverting input terminal 35, the source thereof is connected to the output terminal 37, and the drain thereof is connected to the constant current circuit 33.

In the comparator 12, when the input voltage of the inverting input terminal 36 increases, the first transistor 31 is changed to a current-carrying state and current flows in the current relay circuit 34. The current flows to the output terminal 37.

When the input voltage of the noninverting input terminal 35 increases, the second transistor 32 is changed to a current-carrying state. The second transistor 32 draws the current from the output terminal 37.

When the input voltage of the inverting input terminal 36 is higher than the input voltage of the noninverting input terminal 35, the current flowing from the current relay circuit 34 to the output terminal 37 is greater than the current drawn from the output terminal 37 by the second transistor 32.

In this case, current flows from the output terminal 37 to the outside and the output terminal 37 is usually at a high level.

On the contrary, when the input voltage of the inverting input terminal 36 is lower than the input voltage of the noninverting input terminal 35, the current drawn from the output terminal 37 by the second transistor 32 is greater than the current flowing from the current relay circuit 34 to the output terminal 37.

In this case, current flows from the output terminal 37 to the inside and the output terminal 37 is usually at a low level.

As shown in FIG. 1, the number of comparators 12 is equal to the number of column signal lines 3. The plural comparators 12 are laid out in a line along one side of the pixel area 2. The plural comparators 12 are connected to the plural column signal lines 3 in a one-to-one correspondence manner.

The reference signal line 14 is disposed between the pixel area 2 and the plural comparators 12 and extends along one side of the pixel area 2. Accordingly, the reference signal line 14 intersects the plural column signal lines 3.

In this embodiment, in the comparator 12 disposed at the left end of FIG. 1, the noninverting input terminal 35 is connected to the reference signal line 14 and the inverting input terminal 36 is connected to the column signal line 3.

In the comparator 12 disposed at the second left end adjacent thereto, the noninverting input terminal 35 is connected to the column signal line 3 and the inverting input terminal 36 is connected to the reference signal line 14.

In the comparator 12 disposed at the third left end adjacent thereto, the noninverting input terminal 35 is connected to the reference signal line 14 and the inverting input terminal 36 is connected to the column signal line 3.

That is, in this embodiment, the plural column signal lines 3 are alternately connected to the noninverting input terminals 35 and the inverting input terminals 36 in the arrangement order of the comparators 12.

The reference signal line 14 is connected to the noninverting input terminals 35 and the inverting input terminals 36 alternately in the order opposite to the arrangement order of the plural column signal lines 3.

Hereinafter, when the comparator 12 whose inverting input terminal 36 is connected to the column signal line 3 and the comparator 12 whose noninverting input terminal 35 is connected to the column signal line 3 are distinguished from each other, the former is referred to as a positive input comparator 12 and the latter is referred to as a negative input comparator 12.

Each counter 13 is connected to the output terminal 37 of the corresponding comparator 12 by an output signal line 15. The counter 13 counts up in a period from a predetermined time until the output voltage of the comparator 12 is inverted. The counter 13 may count down.

The outputs of the plural counters 13 are connected to a signal processor 10 by a data output line 9. Accordingly, the plural count values of the plural counters 13 are output to the signal processor 10.

The signal processor 10 may be disposed in the CMOS image sensor 1 or may be disposed in an integrated circuit other than the CMOS image sensor 1.

The signal processor 10 subtracts the count value in a reset period (P phase) from the count value in a reading period (D phase), as described later. The subtraction result is used as a value indicating the received light intensity of the corresponding photo diode 21.

When the counters 13 count up, the signal processor 10 can obtain substantially the same result as that of the down-count, by subtracting the count value of reading period (D phase) from the count value in the reset period (P phase).

The counters 13 may count up in the reading period (D phase) and may count down in the reset period (P phase). In this case, the signal processor 10 can obtain substantially the same result as that of two down-counts, by adding two count values.

That is, the signal processor 10 can obtain the values corresponding to the time difference between the reading period (D phase) and the reset period (P phase) until the outputs of the comparators 12 are inverted, by adding or subtracting the count values in the reset period (P phase) to or from the count values in the reading period (D phase).

The row scanning circuit 5 is connected to the plural row signal lines 4.

The column scanning circuit 7 is connected to the plural counters 13. The column scanning circuit 7 outputs timing signals to the plural counters 13.

The communication timing controller 8 is connected, for example, to the row scanning circuit 5, the column scanning circuit 7, and the reference signal output circuit 11 and controls the circuits.

Reading Operation

An operation of reading a captured image from the CMOS image sensor 1 will be described now. The CMOS image sensor 1 receives light of a subject by the use of the plural photo diodes 21.

The captured image of the subject is acquired on the basis of a two-dimensional light intensity distribution (luminance distribution) represented by the received light intensity of the plural photo diodes 21.

When one image is captured, the row scanning circuit 5 sequentially controls the plural row signal lines 4 to be at a high level line by line under the control of the communication timing controller 8.

The column scanning circuit 7 controls the selection transistors 25 in the unit pixel circuits 20 connected to the row signal line 4, which has been controlled to be at the high level, to be turned on.

Accordingly, some of the plural unit pixel circuits are connected by the row signal lines 4 and the column signal lines 3.

In each period where the row scanning circuit 5 controls the row signal lines 4 to be at the high level, the reference signal output circuit 11 outputs two times a ramp-waveform reference signal varying from the high level to the low level to the reference signal line 14.

The column scanning circuit 7 outputs a timing signal to the counters 13 in synchronization with the timing when the reference signal output circuit 11 starts outputting the reference signal.

FIGS. 4A to 4C are timing diagrams illustrating signal waveforms in the reading period corresponding to one row.

The waveform of the reference signal and the waveform of the pixel signal (signal of the column signal line 3) are shown in FIG. 4A.

The waveform of the output signal of the positive input comparator 12 whose inverting input terminal 36 is connected to the column signal line 3 is shown in FIG. 4B.

The waveform of the output signal of the negative input comparator 12 whose noninverting input terminal 35 is connected to the column signal line 3 is shown in FIG. 4C.

As shown in FIGS. 4A to 4C, the reference signal is controlled in two ramp waveforms in the reading period corresponding to one row. The first ramp waveform is output in the reset period (P phase). The second ramp waveform is output in the reading period (D phase).

In the P phase period and the D phase period, the voltage level of the reference signal is equal to the voltage level of the pixel signal.

At the equal timing, the positive input comparator 12 inverts its output voltage from the high level to the low level. The negative input comparator 12 inverts the output voltage from the low level to the high level.

The counter 13 counts up, for example, in the period from the timing when the reference signal is controlled to be at the high level until the output of the comparator 12 is inverted.

Then, the counter 13 counts two count values of a P-phase count value and a D-phase count value in each reading period corresponding to one row.

In the period where the P-phase ramp waveform is output, the plural reset transistors 23 of the plural unit pixel circuits 20 corresponding to the selected row are controlled to the ON state.

Accordingly, the voltage level of the pixel signal (column signal line 3) becomes a voltage level corresponding to the potential of the floating diffusion FD of the unit pixel circuits 20 in the selected row.

In the counting process with the P phase, the counter 13 counts the count value representing the period until the potential of the column signal line 3 based on the floating diffusion FD is equal to the potential of the reference signal.

In the period where the D-phase ramp waveform is output, the plural selection transistors 25 of the plural unit pixel circuits 20 corresponding to the selected row are controlled to the ON state.

Accordingly, the voltage level of the pixel signal (column signal line 3) becomes a voltage level corresponding to the received light intensity of the photo diodes 21 of the unit pixel circuits 20 in the selected row.

In the counting process with the D phase, the counter 13 counts the count value representing the period until the potential of the column signal line 3 based on the received light intensity of the photo diodes 21 is equal to the potential of the reference signal.

Each counter 13 outputs two count values to the signal processor 10 via the data output line 9.

The signal processor 10 subtracts the P-phase count value of each counter 13 from the D-phase count value.

Accordingly, the light intensity distribution information (luminance distribution information) corresponding to one row of a black-and-white image or a monochromatic image is acquired.

The row scanning circuit 5 sequentially controls the row signal lines 4 to be at the high level line by line and repeatedly performs the control shown in FIGS. 4A to 4C every reading period corresponding to one row.

Accordingly, the light intensity distribution information (luminance distribution information) of a black-and-white image or a monochromatic image is acquired.

An image processor or the like performs a predetermined image process on the black-and-white image or the monochromatic image to acquire a captured image.

Operation

An example of signal waveforms when the outputs of the plural comparators 12 are simultaneously inverted is shown in FIGS. 5A to 5C.

The waveform of the reference signal and the waveform of the pixel signal (the signal of the column signal line 3) are shown in FIG. 5A.

The waveforms of the output signals of the plural comparators 12 whose outputs are simultaneously inverted are shown in FIGS. 5B and 5C.

In FIG. 5A, the waveform of the ideal reference signal shown in FIG. 4A is drawn by a dotted line. In addition, in FIG. 5A, the waveform of the reference signal when the outputs are simultaneously inverted in the CMOS image sensor 1 according to a comparative example shown in FIG. 6 is also drawn by a one-dot-chained line.

Figure 6:
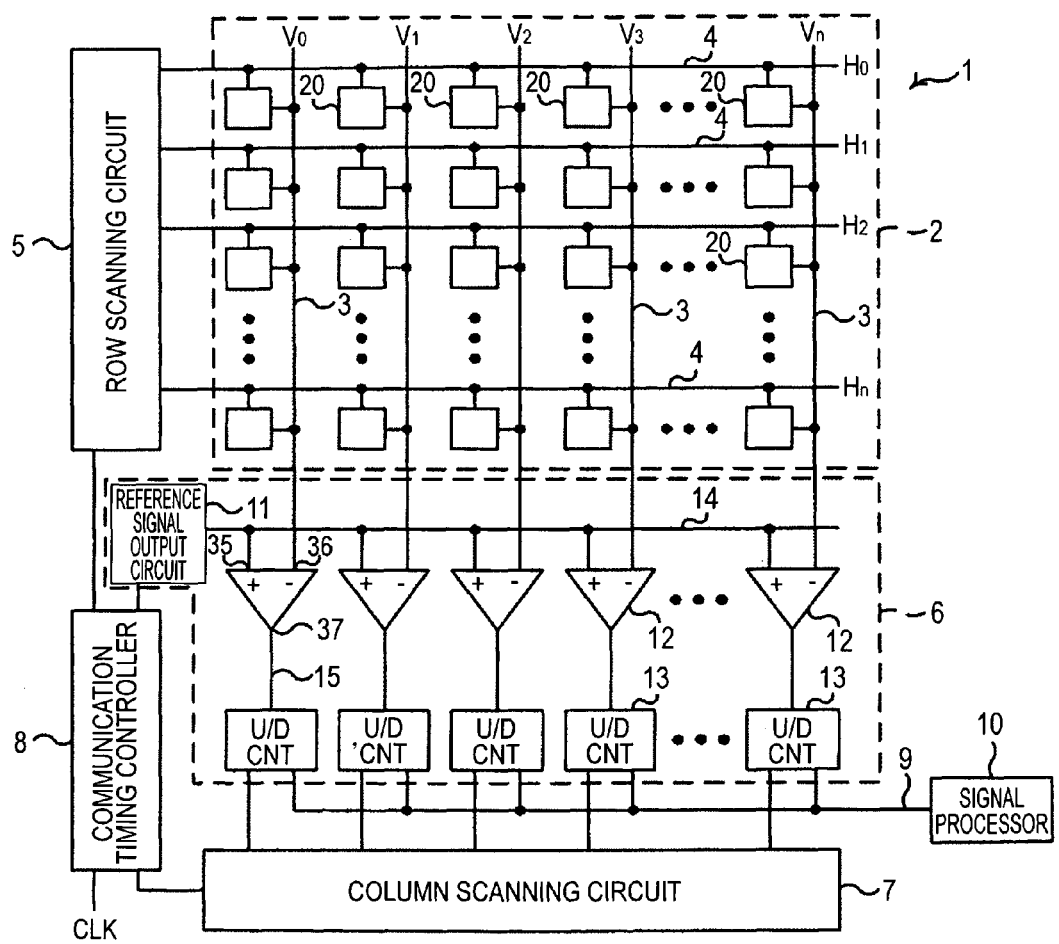
FIG. 6 is a diagram schematically illustrating a layout of a CMOS image sensor according to a comparative example.

The CMOS image sensor 1 shown in FIG. 6 is a general CMOS image sensor 1. Here, the noninverting input terminals 35 of all the comparators 12 are connected to the reference signal line 14 and the inverting input terminals 36 are connected to the column signal lines 3.

That is, all the comparators 12 of the CMOS image sensor 1 shown in FIG. 6 are the positive input comparators 12.

In the manufactured CMOS image sensor 1, as shown in FIG. 5A, when the outputs of the plural comparators 12 are substantially simultaneously inverted, the waveform of the reference signal (Ramp wave), which should be originally drawn as a linear slope, may be distorted.

As indicated by a one-dot-chained line in FIG. 5A, the distortion of the waveform of the reference signal occurs in the CMOS image sensor 1 according to the comparative example shown in FIG. 6. As indicated by a solid line in FIG. 5A, the distortion may occur in the CMOS image sensor 1 shown in FIG. 1.

It is thought that the distortion of the waveform of the reference signal occurs because of the following reason.

As shown in FIG. 1 or 6, since the reference signal line 14 is arranged to intersect the plural column signal lines 3, the coupling to the plural column signal lines 3 is caused.

When the outputs of the plural comparators are simultaneously inverted, the reference signal is influenced by the coupling and the voltage level of the reference signal thus varies.

Accordingly, the waveform of the reference signal is distorted.

In this way, when the outputs of the plural comparators 12 are simultaneously inverted at the times when the reference signal is equal to the plural pixel signals and thus the reference signal is distorted, the following disadvantage may be caused.

That is, as shown in FIGS. 5B and 5C, the plural comparators 12 include some comparators 12 whose outputs are inverted at times slightly later than those of the other comparators 12 at the time of simultaneous inversion due to a characteristic difference or a signal delay difference.

The comparator 12 whose output is inverted at a later time as shown in FIG. 5C compares the pixel signal (the signal of the column signal line 3) with the reference signal distorted by the influence of the comparator 12 whose output is inverted earlier as shown in FIG. 5A, and inverts its output.

In this way, the plural comparators 12 whose outputs are simultaneously inverted include some comparators 12 whose outputs are inverted at times later than those of the other comparators 12. The delay time of the comparator 12 whose output is inverted at the later time varies depending on the variation of the reference signal.

It is generally recognized that the comparators 12 invert the outputs after the pixel signals and the reference signal reach the same level, as shown in FIGS. 4A to 4C.

With this recognition, even when the waveform of the reference signal is distorted by the simultaneous inversion of the outputs, the output of any comparator 12 does not vary in inversion timing.

However, actually manufacturing, the characteristics of the plural comparators 12 are not the same.

Accordingly, the comparator 12 whose output is inverted at an earlier time as shown in FIG. 5B and the comparator 12 whose output is inverted at a later time as shown in FIG. 5C exist in the plural comparators 12 whose outputs are simultaneously inverted.

A noise is introduced into the reference signal line 14 to distort the reference signal, as shown in FIG. 5A, by the output inverting operation of the comparator 12 whose output is inverted at the earlier time at the time of the simultaneous inversion.

The comparator 12 whose output is inverted at the later time at the time of the simultaneous inversion compares the pixel signal with the reference signal having the distorted waveform and inverts its output, as shown in FIG. 5C.

Accordingly, the comparator 12 whose output is inverted at the later time in the simultaneous inversion inverts its output under the influence of the noise.

In the influenced row (the comparators 12), the count values vary.

The image noise due to the variation of the reference signal is generated as a fixed pattern noise when a certain subject is imaged.

Figure 7:
FIG. 7 is a diagram illustrating an example of a subject whose captured image can be improved in image quality by the use of a CDS process.

First, as shown in FIG. 7, an example where a subject (a subject captured as a dark image or the like) having the uniform luminance (the uniform received light intensity) in the row direction is imaged will be described.

In this case, in the column influenced by the noise (in the comparators 12 whose outputs are inverted at the later times), the noise amount generated in the reset period (P phase) and the noise amount generated in the reading period (D phase) are substantially equal to each other as shown in FIGS. 5A to 5C. Since the noises can be removed by a calculation process, the fixed pattern noise is not generated.

In this way, when the P-phase noise amount and the D-phase noise amount are substantially equal to each other, some comparators 12 having a later time in the simultaneous inversion of outputs compare the distorted reference signal with the pixel signals, similarly in the P phase and the D phase, as shown in FIG. 5C and invert the outputs.

Accordingly, the output inversion time in the D phase of some comparators 12 varies by the same magnitude as the variation amount of the output inversion time in the P phase.

As shown in FIG. 5C, when the comparison is made on the basis of the original output inversion time with the reference signal not distorted, the timing gap time T2 in D phase is substantially equal to the timing gap time T1 in the P phase.

The count value in the D phase varies by the same value as the variation of the count value in the P phase.

Therefore, the noise can be canceled thereafter by the subtraction process (the CDS (Correlated Double Sampling) process) in the signal processor 10.

As a result, the variation in voltage level of the reference signal line 14 is not shown in the captured image.

Figure 8:
FIG. 8 is a diagram illustrating an example of a subject whose captured image may have a horizontal streak not removed by the use of the CDS process.

On the contrary, for example, as shown in FIG. 8, when a subject divided into a white area and a black area in the row direction is imaged, a fixed pattern noise may occur in the captured image due to the influence of the variation in voltage level of the reference signal line 14.

When the subject is divided into the white area and the black area in the row direction, the number of comparators whose outputs are simultaneously inverted is reduced substantially to a half by the determination on the black area.

Accordingly, as shown in FIG. 9A, the variation of the reference signal in the reading period (D phase) is smaller than the variation of the reference signal in the reset period (P phase). The noise amount of the reference signal is divided into two types. FIGS. 9A to 9C show the same waveforms as shown in FIGS. 5A to 5C.

That is, as shown in FIG. 9C, with respect to the original output inversion timing when the reference signal is not distorted, the timing gap time T4 in the D phase is smaller than the timing gap time T3 in the P phase.

The count value in the D phase varies by a value different from the variation of the count value in the P phase.

The difference in variation corresponding to the time difference (T4–T3) of the gap time is not cancelled by the CDS process of the signal processor 10.

As a result, in the CMOS image sensor 1 according to the comparative example shown in FIG. 6, when the subject shown in FIG. 8 is imaged, the calculated value of the comparator 12 whose output is inverted at the later time includes the difference in variation corresponding to T4–T3 and is not the value representing the black.

The calculated value of the comparator 12 whose output is inverted at the later time is different from the calculated values of the other comparators 12.

The comparator 12 whose output is inverted at the later time always inverts its output at the time later than the other comparators 12 and is influenced by the variation of the reference signal.

Therefore, in the CMOS image sensor 1 according to the comparative example shown in FIG. 6, when the subject shown in FIG. 8 is imaged, the reference signal greatly varies as indicated by the one-dot-chained line in FIG. 9A and a streaking (a horizontal streak, a streak in the row direction) is generated as shown in FIG. 10.

The captured image shown in FIG. 10 is an example of an image in which the horizontal streak (streaking) occurs in the lower-half black area.

The captured image shown in FIG. 10 is an example of an image in which a noise not removed by the CDS process of the plural comparators 12 occurs.

The generation positions of the horizontal streaks are expressed by white lines in FIG. 10.

In this way, when the subject shown in FIG. 8 is imaged, the image shown in FIG. 10 may be acquired. However, in the CMOS image sensor 1 shown in FIG. 1, the plural comparators 12 are classified into the positive input comparators 12 and the negative input comparators 12.

The plural column signal lines 3 are alternately connected to the plural comparators 12. The reference signal line 14 is alternately connected to the plural comparators 12.

Since this connection pattern is employed in the CMOS image sensor 1 shown in FIG. 1, as indicated by the solid line in FIG. 9A, the variation in voltage level of the reference signal is suppressed at the time of simultaneously inverting the outputs of the plural comparators 12.

The noise reduction effect of the reference signal results from the following two reasons.

First, by alternately switching the connection relation of the reference signal line 14 and the column signal lines 3 among the plural comparators 12, the output inversion times are deviated minutely. Accordingly, the number of comparators 12 whose outputs should be simultaneously inverted is actually reduced.

Second, by switching the connection relation of the reference signal line 14 and the column signal lines 3 between two neighboring comparators 12, the noises due to the two comparators 12 are cancelled.

For example, the case where the comparators 12 in the neighboring columns have complete symmetry and the inversion times in two neighboring columns (the comparators 12) are completely equal to each other will be described.

In this case, the magnitude and phase of the signal in the reference signal due to the inversion of the output level of the comparators 12 on one side from the high level to the low level are opposite to the magnitude and phase of the noise in the reference signal due to the inversion of the output level of the comparators 12 on the other side from the low level to the high level.

The noises are introduced in to the same reference signal line 14, thereby canceling the noises in the reference signal line 14.

For these two reasons, it is thought that when the outputs of the plural comparators 12 are simultaneously inverted, the influence of the noises on the reference signal line 14 is markedly reduced and thus the reference signal is hardly distorted.

In the CMOS image sensor 1 shown in FIG. 1, even when the outputs of the plural comparators 12 are simultaneously inverted, the reference signal is hardly distorted.

Accordingly, even when the subject (the subject in which the noise amounts in the P phase and the D phase are extremely dispersed) shown in FIG. 8 are imaged, the magnitudes of the gap time T3 and T4 are reduced.

As a result, the influence on the calculated value (T4–T3) is reduced and the streaking in the captured image is not visible.

No fixed pattern noise is generated in the captured image.

As shown in FIG. 1, in the configuration in which the inversion polarity of the outputs of the plural comparators 12 are reverse between the neighboring columns, it is possible to improve the image quality of a captured image of a subject having a low spatial frequency and to obtain the best effect in a captures image of a subject having a higher spatial frequency.

As a result, the following advantages are obtained in this embodiment.

By alternately connecting the reference signal line 14 to the plural comparators 12, it is possible to suppress the variation in voltage level of the reference signal and to suppress the influence of the variation on the captured image.

The value corresponding to the time difference in twice inversion operations of the comparators 12 is calculated using two count values of the counters 13.

Therefore, when the voltage level of the reference signal varies similarly in twice inversion operations of the comparators 12, it is possible to obtain the calculated value on which the influence of the variation has been suppressed.

As a result, it is possible to suppress the influence of the variation in voltage level of the reference signal on the captured image.

In this embodiment, in the reset period (P phase) before reading the output of the photo diodes 21 and the reading period (D phase), the voltage level of the reference signal is made to vary twice in synchronization with the counters and the final value is calculated from the twice count values.

Accordingly, in this embodiment, it is possible to remove the influence of the variation in voltage level of the reference signal using the calculating process and to perform the CDS process at the same time.

In this embodiment, it is possible to suppress the influence of a noise component for other factors, as well as the influence of the variation in voltage level of the reference signal on the captured image.

In this embodiment, the variation in voltage level of the reference signal is suitably suppressed.

When the variation in voltage level of the reference signal exists between two times of ramp control, the influence thereof can be hardly effectively removed only using the CDS process. However, in this embodiment, even in such a case, it is possible to improve the image quality of the captured image.

In this embodiment, two times of ramp control of the reference signal output circuit 11 can be used along with two times of ramp control for the CDS process.

Accordingly, in the CMOS image sensor 1 in which the CDS process is performed, it is possible to suppress two influences described above without changing the communication timing controller 8 or the like.

Two times of ramp control of the reference signal output circuit 11 may be carried out in a period other than the reading period (D phase) and the reset period (P phase).

2. Second Embodiment

Configuration of Solid-State Imaging Device

Figure 11:
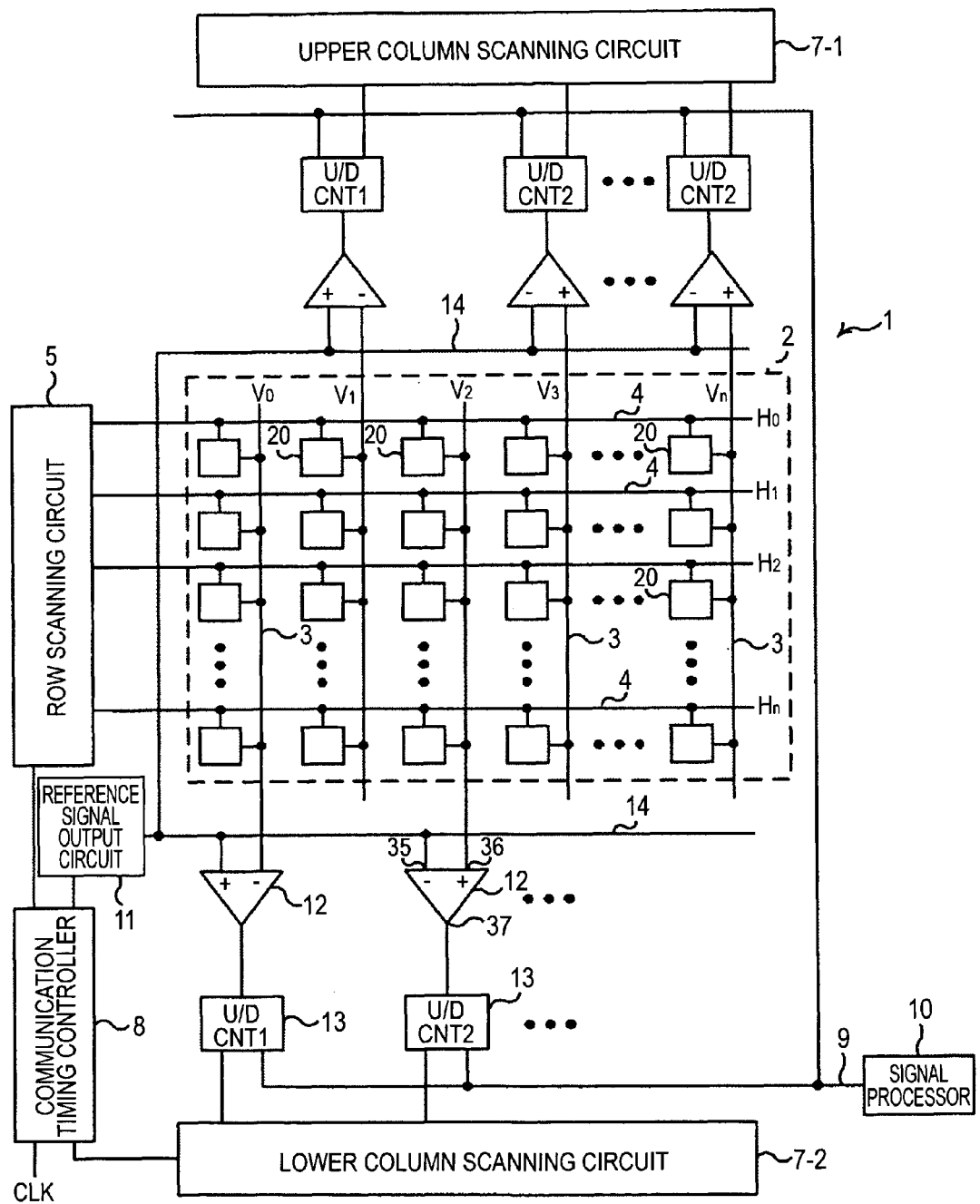
FIG. 11 is a diagram schematically illustrating a layout of a CMOS image sensor employing a solid-state imaging device according to a second embodiment of the present invention.

FIG. 11 is a diagram schematically illustrating the layout of a CMOS image sensor 1 employing a solid-state imaging device according to another embodiment of the present invention. Here, the elements of the CMOS image sensor 1 such as the plural comparators 12 and the plural counters 13 are the same as those in the first embodiment.

However, the embodiments are different from each other in layout and arrangement of various signal lines.

Specifically, the plural comparators 12 and the plural counters 13 are alternately arranged in the upper part and the lower part of the pixel area 2 in the arrangement order in the column direction.

The plural comparators 12 and the plural counters in the upper part of the pixel area 2 are arranged in lines, respectively.

The plural comparators 12 and the plural counters in the lower part of the pixel area 2 are arranged in lines, respectively.

The column scanning circuit 7 is divided into two of an upper column scanning circuit 7-1 in the upper part of the pixel area 2 and a lower column scanning circuit 7-2 in the lower part of the pixel area 2.

The plural column signal lines 3 are alternately connected to the plural comparators 12 in the upper part of the pixel area 2 and the plural comparators 12 in the lower part.

The plural column signal lines 3 are alternately connected to the noninverting input terminals 35 and the inverting input terminals 36 of the plural comparators 12 in the arrangement order of the comparators 12 in the column every upper or lower column of the plural comparators 12.

Accordingly, the plural column signal lines 3 are alternately connected to the noninverting input terminals 35 and the inverting input terminals 36 in the arrangement order of the comparators 12 every column of the comparators 12.

The reference signal line 14 is divided into two lines in the middle way, which are connected to the plural comparators 12 in the upper part of the pixel area 2 and the plural comparators 12 in the lower part.

The reference signal line 14 is alternately connected to the noninverting input terminals 35 and the inverting input terminals 36 of the plural comparators 12 in the arrangement order of the comparators 12, which is opposite to the arrangement order of the plural column signal lines 3, in the column every upper or lower column of the plural comparators 12.

Accordingly, the reference signal line 14 is alternately connected to the noninverting input terminals 35 and the inverting input terminals 36 in the order opposite to the arrangement order of the plural column signal lines 3 every column of the comparators 12.

Operation

The reference signal output circuit 11 outputs the reference signal of two ramp waveforms shown in FIGS. 4A to 4C every reading period corresponding to one row.

The positive input comparators 12 whose inverting input terminal 36 is connected to the column signal line 3 and the negative input comparators 12 whose noninverting input terminal 35 is connected to the column signal line 3 compare the voltage level of the column signal lines 3 with the voltage level of the reference signal and invert the outputs in the reverse phases.

The plural counters 13 in the upper part of the pixel area 2 count in two periods of the reset period (P phase) and the reading period (D phase) until the outputs of the plural comparators 12 in the upper part are inverted after a timing signal is input from the upper column scanning circuit 7-1.

The plural counters 13 in the lower part of the pixel area 2 count in two periods of the reset period (P phase) and the reading period (D phase) until the outputs of the plural comparators 12 in the lower part are inverted after a timing signal is input from the lower column scanning circuit 7-2.

The signal processor 10 calculates the count value in the P phase from the count value in the D phase of each counter 13.

In the manufactured CMOS image sensor 1, when the plural comparators 12 are divided and laid out into the upper part and the lower part of the pixel area 2 as shown in FIG. 11, the plural comparators 12 in each column have characteristic differences and the comparators 12 in the columns have characteristic differences.

The divided reference signal lines 14 intersect the column signal lines 3 to overlap with each other in the upper part of the pixel area 2 and intersect the plural column signal lines 3 to overlap with each other in the lower part of the pixel area 2.

Accordingly, the reference signal line 14 causes the coupling to the plural column signal lines 3 separately in two places of the divided portion in the upper part of the pixel area 2 and the divided portion in the lower part.

In FIG. 11, the plural column signal lines 3 are alternately connected to the noninverting input terminals 35 and the inverting input terminals 36 of the plural comparators 12 every upper or lower column and the reference signal line 14 is alternately connected thereto every column.

Accordingly, in FIG. 11, the inversion timing can be suitably shifted in the upper group of the plural comparators 12 and the inversion timing can be suitable shifted in the lower group of the plural comparators 12.

In this connection, the inversion polarities of the outputs of the plural comparators 12 are reverse every two columns with respect to the column signal lines 3.

As a result, in this embodiment, it is possible to suppress the variation in voltage level of the reference signal, for example, when a black-and-white image is captured and the outputs of the plural comparators 12 are simultaneously inverted.

Accordingly, the streaking (horizontal streaks in a specific captured image) which is not removed by the CDS process is hardly formed in the captured image.

In this embodiment, even when the voltage level of the reference signal varies, it is possible to remove the variation using the CDS process.

3. Third Embodiment

Configuration of Solid-State Imaging Device

Figure 12:
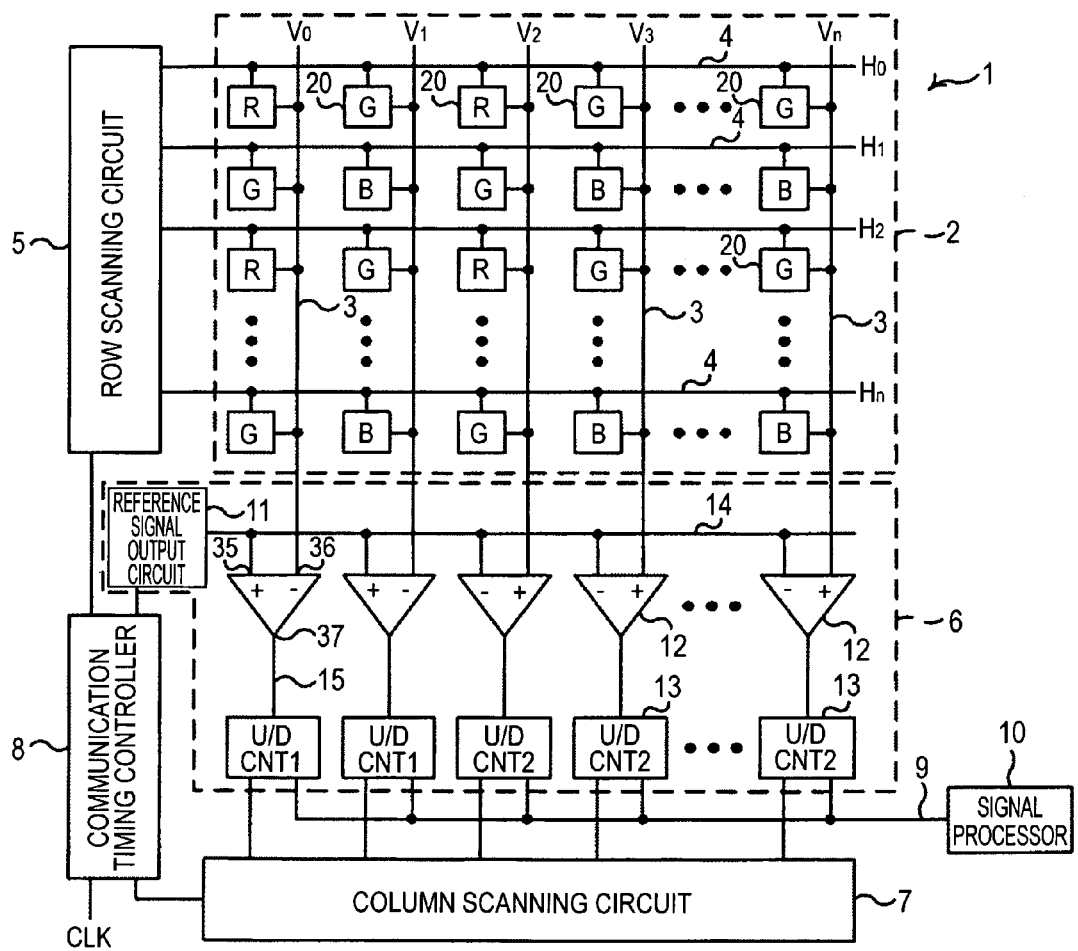
FIG. 12 is a diagram schematically illustrating a layout of a CMOS image sensor employing a solid-state imaging device according to a third embodiment of the present invention.

FIG. 12 is a diagram schematically illustrating the layout of a CMOS image sensor 1 employing a solid-state imaging device according to another embodiment of the present invention. Here, the elements of the CMOS image sensor 1 such as the plural comparators 12 and the plural counters 13 are the same as those in the first embodiment.

However, the CMOS image sensor 1 shown in FIG. 12 is used for a color image in which RGB color components are assigned to the plural photo diodes 21 in the Bayer arrangement. Accordingly, this embodiment is different from the first embodiment in connections of various signal lines.

Specifically, in the comparator 12 at the left end of FIG. 12, the noninverting input terminal 35 is connected to the reference signal line 14 and the inverting input terminal 36 is connected to the column signal line 3.

In the comparator 12 on the right side thereof, the noninverting input terminal 35 is connected to the reference signal line 14 and the inverting input terminal 36 is connected to the column signal line 3.

In the comparator 12 on the right side thereof, the noninverting input terminal 35 is connected to the column signal line 3 and the inverting input terminal 36 is connected to the reference signal line 14.

In the comparator 12 on the right side thereof, the noninverting input terminal 35 is connected to the column signal line 3 and the inverting input terminal 36 is connected to the reference signal line 14.

In this way, the plural column signal lines 3 are alternately connected to the noninverting input terminals 35 and the inverting input terminals 36 of sets, each of which includes two comparators 12 neighbored in the arrangement order thereof, in the arrangement order of the sets.

The reference signal line 14 is alternately connected to the noninverting input terminals 35 and the inverting input terminals 36 in the arrangement order of the sets, which is opposite to the arrangement order of the plural column signal lines 3.

Operation

The reference signal output circuit 11 outputs the reference signal of two ramp waveforms shown in FIGS. 4A to 4C every reading period corresponding to one row.

The positive input comparators 12 whose inverting input terminal 36 is connected to the column signal line 3 and the negative input comparators 12 whose noninverting input terminal 35 is connected to the column signal line 3 compare the voltage level of the column signal lines 3 with the voltage level of the reference signal and invert the outputs in the reverse phases.

The counters 13 count in two periods of the reset period (P phase) and the reading period (D phase) until the outputs of the comparators 12 are inverted after a timing signal is input from the column scanning circuit 7.

The signal processor 10 calculates the count value in the P phase from the count value in the D phase of each counter 13.

In the manufactured CMOS image sensor 1, the plural comparators 12 have characteristic differences.

The reference signal line 14 intersects the plural column signal lines 3 to overlap with each other and causes the coupling to the plural column signal lines 3.

When two neighboring photo diodes 21 in each row receive different color light components, the received light intensities of two neighboring photo diodes 21 are hardly equal to each other. On the contrary, the received light intensities of two photo diodes 21 neighboring every two photo diodes in each row may be equal to each other.

That is, the sensitivity of each pixel (photo diode 21) varies depending on the received color components. Even when the same light is incident on the neighboring pixels (photo diodes 21), the output inverting times of two comparators 12 connected to the pixels are hardly equal to each other.

Accordingly, even when the connection of the comparators 12 is changed between the neighboring pixels (photo diodes 21), it is not possible to effectively remove the noise of the reference signal due to the simultaneous inversion of the outputs of the plural comparators 12.

Accordingly, as shown in FIG. 12, the plural column signal lines 3 are alternately connected to the noninverting input terminals 35 and the inverting input terminals 36 every set of two comparators 12 and the reference signal line 14 is alternately connected every set.

Accordingly, it is possible to suitably shift the output inverting times of the plural comparators 12 whose outputs can be simultaneously inverted.

In this connection, the inversion polarities of the outputs of the plural comparators 12 are reverse every two columns with respect to the column signal lines 3.

As a result, in this embodiment, it is possible to suppress the variation in voltage level of the reference signal, for example, when a color image is captured and the outputs of the plural comparators 12 are simultaneously inverted.

Accordingly, the streaking (horizontal streaks in a specific captured image) which is not removed by the CDS process is hardly formed in the captured image.

In this embodiment, even when the voltage level of the reference signal varies, it is possible to remove the variation using the CDS process.

4. Fourth Embodiment

Configuration of Solid-State Imaging Device

Figure 13:
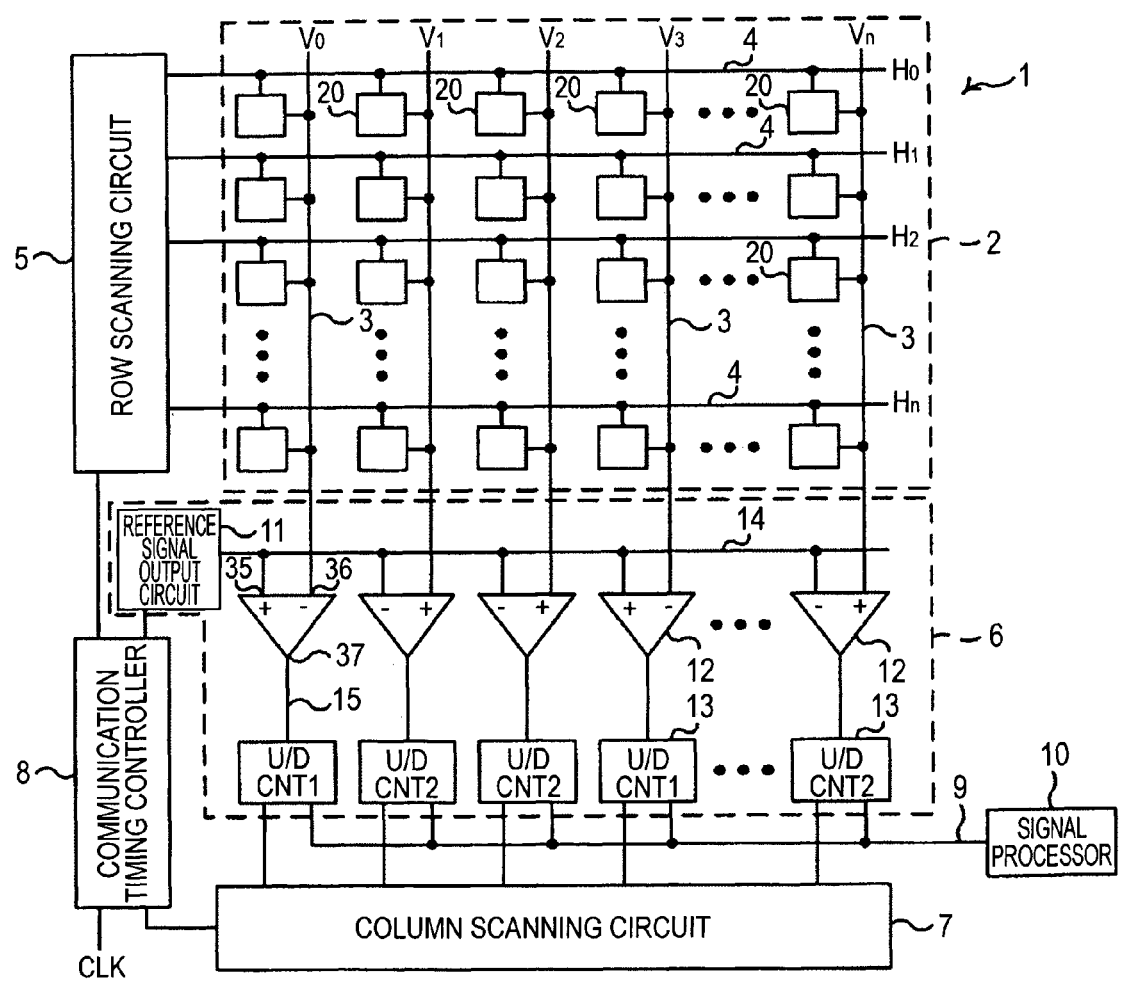
FIG. 13 is a diagram schematically illustrating a layout of a CMOS image sensor employing a solid-state imaging device according to a fourth embodiment of the present invention.

FIG. 13 is a diagram schematically illustrating the layout of a CMOS image sensor 1 employing a solid-state imaging device according to another embodiment of the present invention. Here, the elements of the CMOS image sensor 1 such as the plural comparators 12 and the plural counters 13 are the same as those in the first embodiment.

However, this CMOS image sensor 1 is different from that according to the first embodiment, in connections of various signal lines.

Specifically, in the comparator 12 at the left end of FIG. 13, the noninverting input terminal 35 is connected to the reference signal line 14 and the inverting input terminal 36 is connected to the column signal line 3.

In the comparator 12 on the right side thereof, the noninverting input terminal 35 is connected to the column signal line 3 and the inverting input terminal 36 is connected to the reference signal line 14.

In the comparator 12 on the right side thereof, the noninverting input terminal 35 is connected to the column signal line 3 and the inverting input terminal 36 is connected to the reference signal line 14.

In this way, the plural column signal lines 3 are connected so that the connection pattern to the noninverting input terminals 35 and the inverting input terminals 36 forms a constant repeated pattern in the arrangement order of the comparators 12.

The reference signal line 14 is connected so that the connection pattern to the noninverting input terminals 35 and the inverting input terminals 36 forms a constant repeated pattern, which is opposite to that of the plural column signal lines 3, in the arrangement order of the comparators 12.

Operation

The reference signal output circuit 11 outputs the reference signal of two ramp waveforms shown in FIGS. 4A to 4C every reading period corresponding to one row.

The positive input comparators 12 whose inverting input terminal 36 is connected to the column signal line 3 and the negative input comparators 12 whose noninverting input terminal 35 is connected to the column signal line 3 compare the voltage level of the column signal lines 3 with the voltage level of the reference signal and invert the outputs in the reverse phases.

The counters 13 count in two periods of the reset period (P phase) and the reading period (D phase) until the outputs of the comparators 12 are inverted after a timing signal is input from the column scanning circuit 7.

The signal processor 10 calculates the count value in the P phase from the count value in the D phase of each counter 13.

In the manufactured CMOS image sensor 1, the plural comparators 12 have characteristic differences.

The reference signal line 14 intersects the plural column signal lines 3 to overlap with each other and causes the coupling to the plural column signal lines 3.

When the neighboring comparators 12 have no complete symmetry, the noise amount in the reference signal varies. Accordingly, even when the reference signal line 14 is alternately one by one connected to the plural comparators as shown in FIG. 1, the noise component may not be effectively removed from the reference signal.

In this case, as described in this embodiment, the connection pattern of the noninverting input terminals 35 and the inverting input terminals 36 to the reference signal line 14 can be set to the constant repeated pattern corresponding to the noise ratio.

Accordingly, it is possible to effectively shift the output changing times of the plural comparators 12 whose outputs are simultaneously changed and to more effectively remove the noise component having no symmetry.

In FIG. 13, the variation due to the noise component of the reference signal can be effectively removed in the following case.

That is, the case is that the absolute value of the noise component of the reference signal due to the inversion of the output of the positive input comparator 12 from the low level to the high level is twice greater than the absolute value of the noise component of the reference signal due to the inversion of the output of the negative input comparator 12 from the high level to the low level.

As a result, in this embodiment, it is possible to suppress the variation in voltage level of the reference signal, for example, when a black-and-white image or a monochromatic image is captured and the outputs of the plural comparators 12 are simultaneously inverted.

Particularly, when the ratio of the noise amount of the reference signal due to the positive input comparator 12 and the noise amount of the reference signal due to the negative input comparator 12 is opposite to the connection ratio in the repeated pattern, it is possible to properly suppress the variation in voltage level of the reference signal at the time of simultaneously inverting the outputs of the plural comparators 12.

Accordingly, the streaking (horizontal streaks in a specific captured image) which is not removed by the CDS process is hardly formed in the captured image.

In this embodiment, even when the voltage level of the reference signal varies, it is possible to remove the variation using the CDS process.

5. Fifth Embodiment

Configuration of Solid-State Imaging Device

Figure 14:
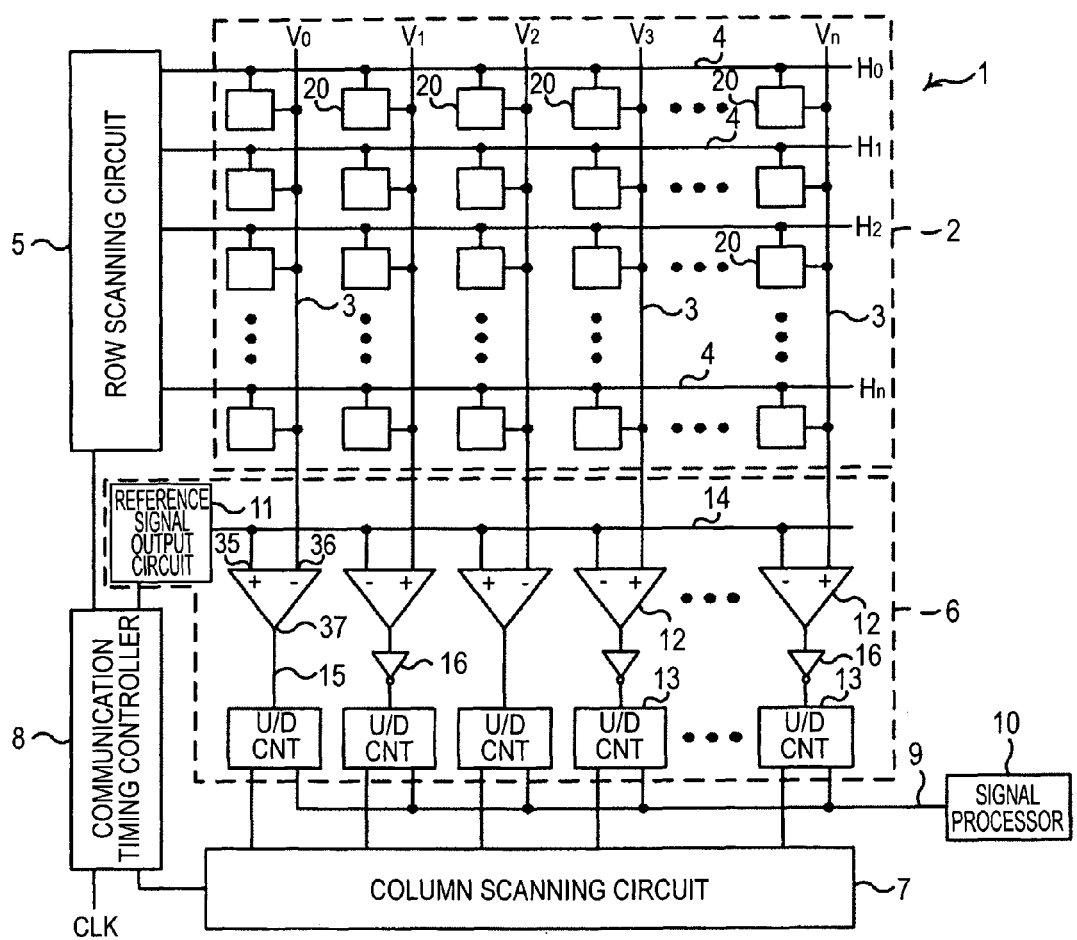
FIG. 14 is a diagram schematically illustrating a layout of a CMOS image sensor employing a solid-state imaging device according to a fifth embodiment of the present invention.

FIG. 14 is a diagram schematically illustrating the layout of a CMOS image sensor 1 employing a solid-state imaging device according to another embodiment of the present invention. Here, the elements of the CMOS image sensor 1 such as the plural comparators 12 and the plural counters 13 are the same as those in the first embodiment.

However, this embodiment is different from the first embodiment, in that plural inverter circuits 16 are provided.

The inverter circuit 16 is connected between the counter 13 and the negative input comparator 12 whose noninverting input terminal 35 is connected to the column signal line 3. The inverter circuit 16 inverts the output level of the negative input comparator 12 and outputs the inverted level to the counter 13.

In this way, by connecting the inverter circuit 16 to the output of the negative input comparator 12, it is possible to input a signal varying with the same phase as the counters 13 even when the rising characteristic and the falling characteristic of the output signal of the comparator 12 have no complete symmetry.

It is possible to input a signal not influenced by the asymmetry of the rising characteristic and the falling characteristic of the output signal of the comparators 12 to the counters 13.

Operation

The reference signal output circuit 11 outputs the reference signal of two ramp waveforms shown in FIGS. 4A to 4C every reading period corresponding to one row.

The positive input comparators 12 whose inverting input terminal 36 is connected to the column signal line 3 and the negative input comparators 12 whose noninverting input terminal 35 is connected to the column signal line 3 compare the voltage level of the column signal lines 3 with the voltage level of the reference signal and invert the outputs in the reverse phases.

The inverter circuit 16 inverts the output level of the negative input comparator 12 and outputs the inverted level to the counter 13.

The counters 13 count in two periods of the reset period (P phase) and the reading period (D phase) until the outputs of the comparators 12 are inverted after a timing signal is input from the column scanning circuit 7.

The signal processor 10 calculates the count value in the P phase from the count value in the D phase of each counter 13.

As a result, in this embodiment, it is possible to suppress the variation in voltage level of the reference signal, for example, when a black-and-white image or a monochromatic image is captured and the outputs of the plural comparators 12 are simultaneously inverted.

Accordingly, the streaking (horizontal streaks in a specific captured image) which is not removed by the CDS process is hardly formed in the captured image.

In this embodiment, even when the voltage level of the reference signal varies, it is possible to remove the variation using the CDS process.

6. Sixth Embodiment

Configuration of Solid-State Imaging Device

Figure 15:
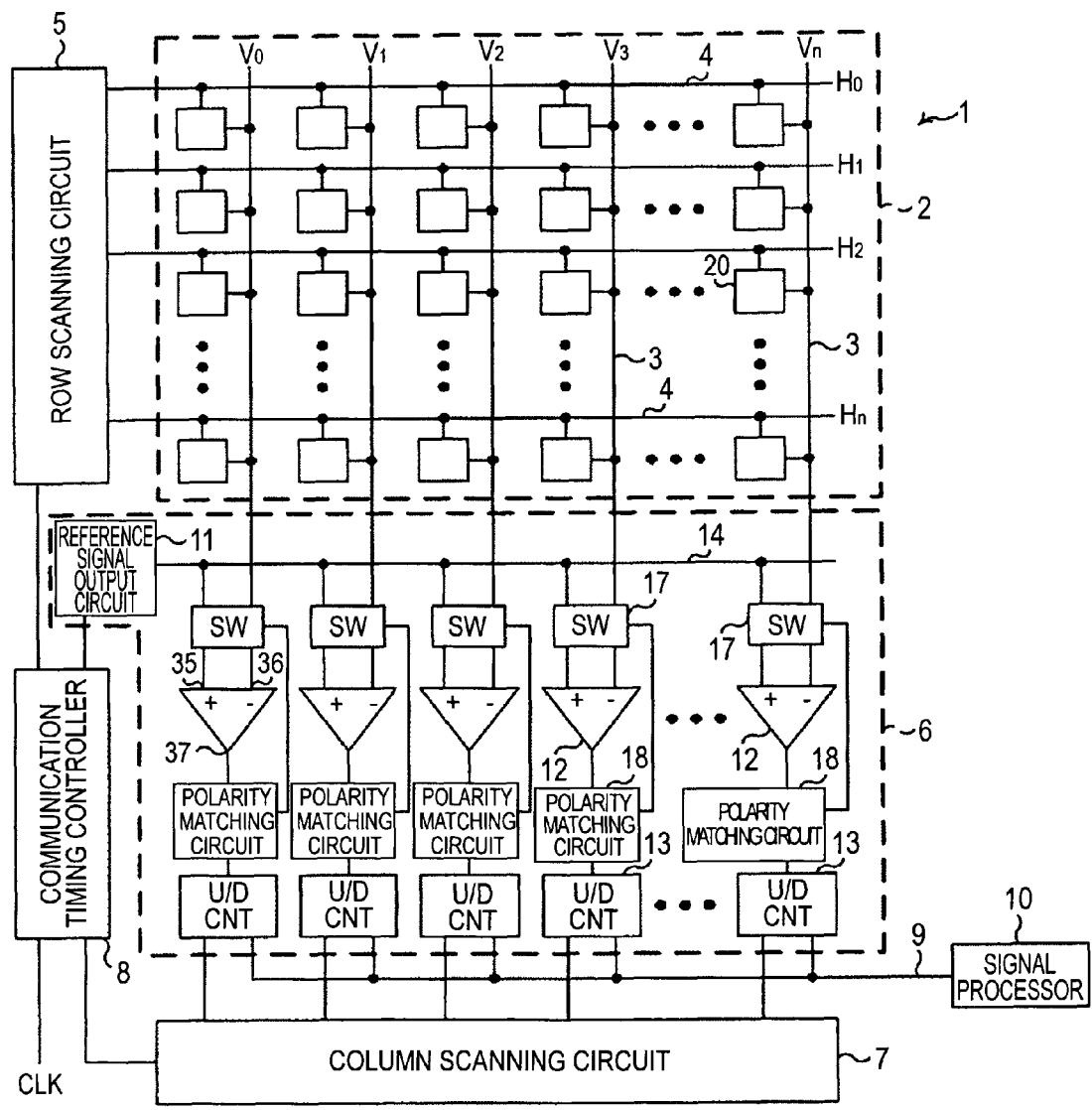
FIG. 15 is a diagram schematically illustrating a layout of a CMOS image sensor employing a solid-state imaging device according to a sixth embodiment of the present invention.

FIG. 15 is a diagram schematically illustrating the layout of a CMOS image sensor 1 employing a solid-state imaging device according to another embodiment of the present invention. Here, the elements of the CMOS image sensor 1 such as the plural comparators 12 and the plural counters 13 are the same as those in the first embodiment.

However, this embodiment is different from the first embodiment, in that plural switch circuits 17 and plural polarity matching circuits 18 corresponding to the number of plural comparators 12 are provided.

Each switch circuit 17 is connected to the reference signal line 14, the corresponding column signal line 3, and the noninverting input terminal 35 and the inverting input terminal 36 of the corresponding comparator 12.

The switch circuit 17 connects one of the reference signal line 14 and the column signal line 3 to the noninverting input terminal 35 and connects the other to the inverting input terminal 36 as set.

Accordingly, each comparator 12 serves as the positive input comparator 12 or the negative input comparator 12 as set by the switch circuit 17.

Each polarity matching circuit 18 is connected to the output terminal 37 of the corresponding comparator 12 and the corresponding counter 13.

The polarity matching circuit 18 serves to output the output signal of the comparator 12 to the counter 13 without any inversion or to output the output signal of the comparator 12 to the counter 13 with the inverted polarity as set.

The polarity matching circuit 18 can include, for example, an inverter circuit inverting the polarity of an input signal and a selector selectively outputting one of the output signal and the input signal of the inverter circuit.

Accordingly, the polarity matching circuit 18 can serve as the inverter circuit 16 as set.

Operation

The plural switching circuits 17 may be set, for example, by the communication timing controller 8 and the polarity matching circuits 18 may be set by the switch circuits 17.

The communication timing controller 8 sets the plural switch circuits 17 so that the positive input comparators 12 and the negative input comparators 12 are alternately arranged, for example, when a black-and-white image or a monochromatic image is captured.

Each switch circuit 17 sets the corresponding polarity matching circuit 18 to serve as the inverter circuit when the corresponding comparator 12 connected thereto serves as the negative input comparator 12.

In addition, for example, when a color image is captured using a color filter with the Bayer arrangement, the communication timing generator 8 sets the switch circuits 17 so that the positive input comparators 12 and the negative input comparators 12 are alternately arranged every two comparators 12.

Each switch circuit 17 sets the corresponding polarity matching circuit 18 to serve as the inverter circuit when the corresponding comparator 12 connected thereto serves as the negative input comparator 12.

Under these settings, the CMOS image sensor 1 captures an image.

As a result, in this embodiment, it is possible to suppress the variation in voltage level of the reference signal, for example, when the operations of the plural comparators 12 are switched depending on the types of the images to be captured and the outputs of the plural comparators 12 are simultaneously inverted.

Accordingly, the streaking (horizontal streaks in a specific captured image) which is not removed by the CDS process is hardly formed in the captured image.

In this embodiment, even when the voltage level of the reference signal varies, it is possible to remove the variation using the CDS process.

The CMOS image sensor 1 according to this embodiment can cope with various reading modes (thinning or the like) without changing the circuit configuration.

In this embodiment, the counter 13 is connected to the rear stage of the polarity matching circuit 18 and the P-phase count value and the D-phase count value are subjected to the CDS process.

Accordingly, by providing the switch circuits 17 and the polarity matching circuit 18, it is possible to cancel the different times by the calculation process of the counters 13 even when the variation times of the signals input to the counters 13 are different by columns.

The calculated value after the CDS process is not influenced by the set states of the switch circuits 17 and the polarity matching circuits 18.

The CMOS image sensor 1 may include only the plural switch circuits 17.

In this case, when the polarity of the output of the comparator 12 is changed reverse, the polarity of the signal for controlling the counter 13 is changed reverse. Accordingly, the change of the polarity can be coped with in the counter 13.

7. Seventh Embodiment

Configuration of Image Capturing Apparatus

Figure 16:
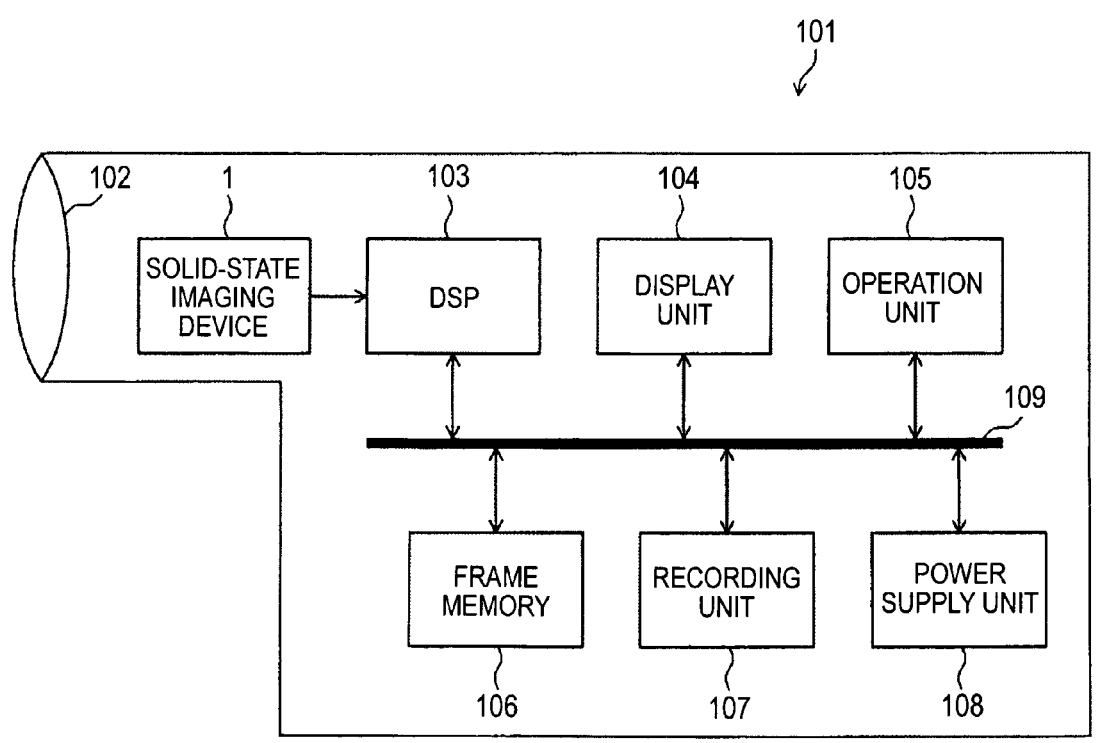
FIG. 16 is a diagram schematically illustrating a configuration of a camera system employing an image capturing apparatus according to a seventh embodiment of the present invention.

FIG. 16 schematically shows the configuration of a camera system 101 employing an image capturing apparatus according to another embodiment of the present invention.

The camera system 101 is a digital still camera or a digital video camera employing the CMOS image sensor 1 according to any one of the above-mentioned embodiments of the invention.

The camera system 101 may be included as a camera module in a mobile apparatus such as a mobile phone.

The camera system 101 shown in FIG. 16 includes a lens group 102 constituting an optical system, the CMOS image sensor (solid-state imaging device) 1, a DSP (Digital Signal Processor) circuit 103, a display unit 104, an operation unit 105, a frame memory 106, a recording unit 107, and a power supply unit 108.

The DSP circuit 103 is connected to the output signal line 15 of the CMOS image sensor 1 and the like. The DSP circuit 103 serves as the signal processor 10.

The DSP circuit 103, the display unit 104, the operation unit 105, the frame memory 106, the recording unit 107, and the power supply unit 108 are connected to each other via a bus line 109.

The lens group 102 concentrates incident light (image light) from a subject onto the pixel area 2 of the CMOS image sensor 1. Accordingly, the image of the subject is formed in the pixel area 2.

The display unit 104 includes, for example, a liquid crystal display panel or an organic EL (Electro-Luminescence) panel. The display unit 104 displays a captured image.

The operation unit 105 includes, for example, a touch panel or operation buttons. The operation unit 105 outputs a control instruction to the CMOS image sensor 1, the DSP circuit 103, the display unit 104, the recording unit 107, or the power supply unit 108.

The power supply unit 108 includes, for example, a battery. The power supply unit 108 supplies power to the CMOS image sensor 1, the DSP circuit 103, the display unit 104, the operation unit 105, and the recording unit 107.

The recording unit 107 includes, for example, a semiconductor memory or an optical recording medium. The recording unit 107 records data of the captured image on the semiconductor memory or the optical recording medium. The semiconductor memory, the optical recording medium, or the like may be detached from the camera system 101.

Operation

For example, when a still image or a moving image is captured, the CMOS image sensor 1 generates the count value of the captured image every frame and outputs the generated count value to the DSP circuit 103.

The DSP circuit 103 performs the CDS process or the like on the plural count values and generates data of the captured image of one frame.

The frame memory 106 stores the data of the captured image.

The display unit 104 reads data from the frame memory 106 and displays the read data.

On the basis of the instruction from the operation unit 105, the recording unit 107 takes the data of the captured image from the frame memory 106 and stores the taken data in the format corresponding to an imaging mode.

In addition, for example, when the captured still image or moving image is displayed, the display unit 104 reads the data from the recording unit 107 and displays the read data.

The camera system 101 according to this embodiment employs the CMOS image sensor 1 according to any one of the above-mentioned embodiments.

Accordingly, when the outputs of the plural comparators 12 are simultaneously inverted, it is possible to suppress the variation in voltage level of the reference signal. It is possible to remove the noise component of the horizontal streak resulting from the gain error between the P phase and the D phase.

As a result, the streaking (the horizontal streak in a specific captured image) which could not be removed by the CDS process hardly occurs in the captured image.

In this embodiment, even when the voltage level of the reference signal varies, it is possible to remove the variation in voltage level by the use of the CDS process. As a result, it is possible to capture a high-quality image.

According to the above-mentioned embodiments of the present invention, it is possible to reduce the influence of a noise on the reference signal when the outputs of the plural comparators 12 are simultaneously inverted.

It is also possible to basically suppress the streaking or the like, which a subject does not have, occurring in a captured image.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a plurality of pixel circuits each including a photoelectric conversion element;
a plurality of reading signal lines connected to the plurality of pixel circuits;
a reference signal output circuit outputting a reference signal whose voltage level varies;
a reference signal line connected to the reference signal output circuit; and
a plurality of comparators each having a first input terminal and a second input terminal and each inverting its output depending on a voltage relation of the first input terminal and the second input terminal,
wherein the first input terminals of some of the plurality of comparators are connected to the reading signal lines and the second input terminals thereof are connected to the reference signal line, and wherein the first input terminals of the other of the plurality of comparators are connected to the reference signal line and the second input terminals thereof are connected to the reading signal lines.

2. The solid-state imaging device according to claim 1, further comprising counters to which the outputs of the comparators are input, respectively,
wherein the reference signal output circuit changes the level of the reference signal in synchronization with the counters, and
wherein each counter counts until the output of the corresponding comparator is inverted in each period where the reference signal output circuit changes the level of the reference signal.

3. The solid-state imaging device according to claim 2, wherein the reference signal output circuit changes the voltage level of the reference signal in a reset period before the outputs of the pixel circuits are read and changes the voltage level of the reference signal in a reading period where the outputs of the pixel circuits are read.

4. The solid-state imaging device according to claim 1, wherein the plurality of photoelectric conversion elements capture a black-and-white image or a monochromatic image,
wherein the plurality of comparators are arranged in a line along one side of a pixel area in which the plurality of pixel circuits are two-dimensionally arranged in a matrix, and
wherein the plurality of reading signal lines are alternately connected to the first input terminals and the second input terminals in the arrangement order of the comparators.

5. The solid-state imaging device according to claim 1, wherein the plurality of photoelectric conversion elements capture a black-and-white image or a monochromatic image,
wherein the plurality of comparators are arranged in two lines along two opposite sides of a pixel area in which the plurality of pixel circuits are two-dimensionally arranged in a matrix, and
wherein the plurality of reading signal lines are alternately connected to the first input terminals and the second input terminals in the arrangement order of the comparators in each line of the comparators.

6. The solid-state imaging device according to claim 1, wherein a plurality of color components are assigned in a Bayer arrangement to the plurality of photoelectric conversion elements so as to capture a color image,
wherein the plurality of comparators are arranged in a line along one side of a pixel area in which the plurality of pixel circuits are two-dimensionally arranged in a matrix, and
wherein the plurality of reading signal lines are alternately connected to the first input terminals and the second input terminals in an arrangement order of sets, each of which includes two neighboring comparators in the arrangement order.

7. The solid-state imaging device according to claim 1, wherein the plurality of comparators are arranged in a line along one side of a pixel area in which the plurality of pixel circuits are two-dimensionally arranged in a matrix, and
wherein the plurality of reading signal lines are connected to the first input terminals and the second input terminals so that a connection pattern to the first input terminals and the second input terminals forms a constant repeated pattern in the arrangement order of the comparators.

8. The solid-state imaging device according to claim 1, wherein the first input terminal is a noninverting input terminal of each comparator, wherein the second input terminal is an inverting input terminal of each comparator, and wherein the outputs of the comparators whose second input terminal is connected to the reference signal line are connected to an inverting circuit.

9. The solid-state imaging device according to claim 1, further comprising a plurality of switch circuits which are connected to the reading signal lines and the reference signal line and which connects one of the reading signal lines and the reference signal line to the first input terminal of the corresponding comparator and connects the other thereof to the second input terminal.

10. The solid-state imaging device according to claim 9, further comprising a plurality of polarity matching circuits being connected to the output of the comparators and inverting the polarity of the output of the corresponding comparator.

11. A signal processing method of a solid-state imaging device comprising the steps of:

connecting some of a plurality of pixel circuits each having a photoelectric conversion element to a plurality of reading signal lines;

outputting a reference signal, a voltage level of which varies, to a reference signal line from a reference signal output circuit; and comparing the voltage levels of the plurality of reading signal lines with the voltage level of the reference signal line using a combination of comparators whose first input terminal is connected to the corresponding reading signal line and a second input terminal is connected to the reference signal line and comparators whose first input terminal is connected to the reference signal line and the second input terminal is connected to the corresponding reading signal line as a plurality of comparators whose output is inverted depending on a voltage relation of the first input terminal and the second input terminal.

12. An image capturing apparatus comprising:

a solid-state imaging device; and an optical system forming an image of a subject on the solid-state imaging device, wherein the solid-state imaging device includes a plurality of pixel circuits each including a photoelectric conversion element, a plurality of reading signal lines connected to the plurality of pixel circuits, a reference signal output circuit outputting a reference signal whose voltage level varies, a reference signal line connected to the reference signal output circuit, and a plurality of comparators each having a first input terminal and a second input terminal and each inverting its output depending on a voltage relation of the first input terminal and the second input terminal, wherein the first input terminals of some of the plurality of comparators are connected to the reading signal lines and the second input terminals thereof are connected to the reference signal line, and wherein the first input terminals of the other of the plurality of comparators are connected to the reference signal line and the second input terminals thereof are connected to the reading signal lines.

* * * * *